Figure 1:
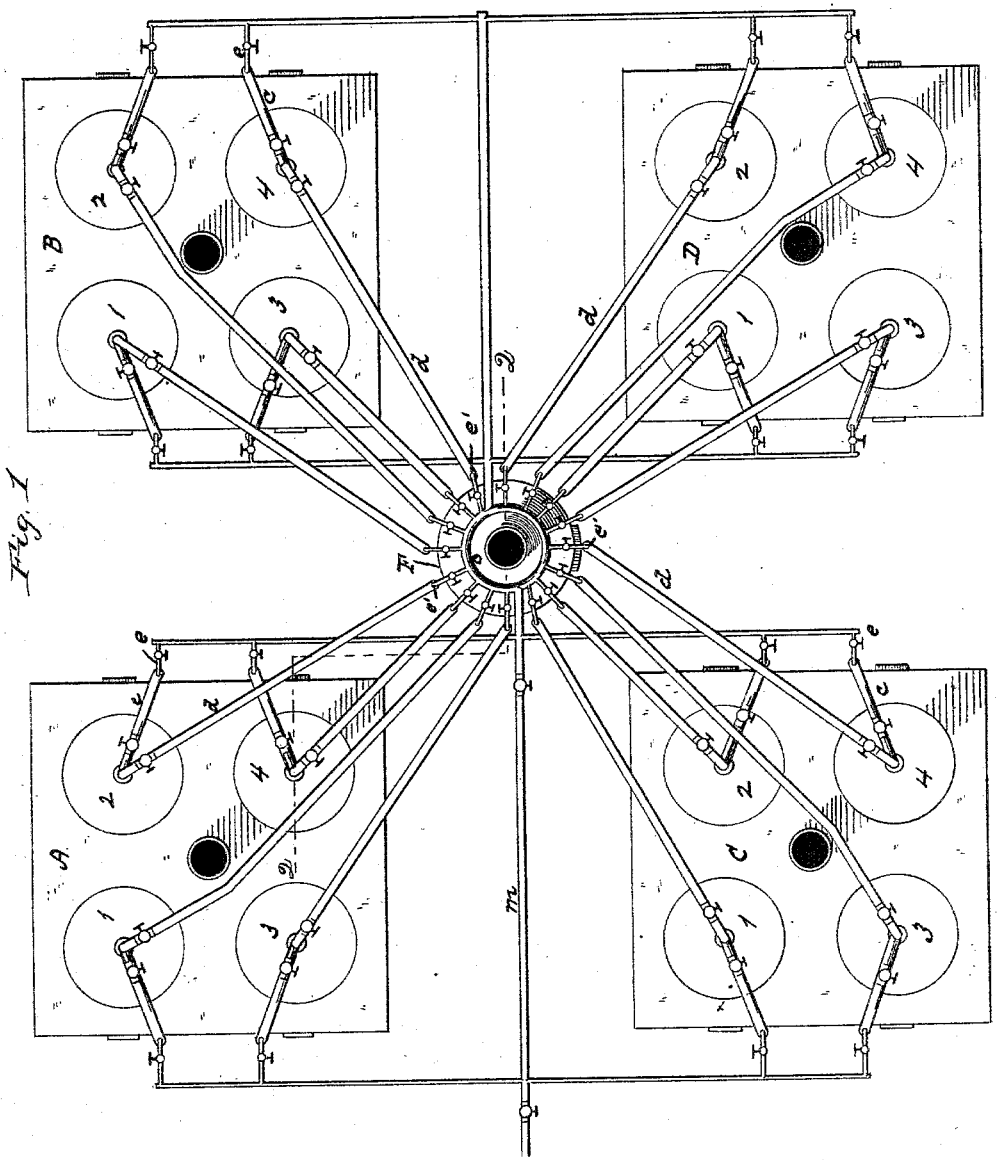

(No Model.)  2 Sheets—Sheet 1.

E. J. DE SMEDT.
REFINING ASPHALTUM.

No. 286,396. Patented Oct. 9, 1883.

Witnesses
H. A. Low
E. A. Dick

Inventor
Edward J. De Smedt
by Marcellus Bailey
his attorney (No Model.) 2 Sheets—Sheet 2.
E. J. DE SMEDT.
REFINING ASPHALTUM.
No. 286,396. Patented Oct. 9, 1883.
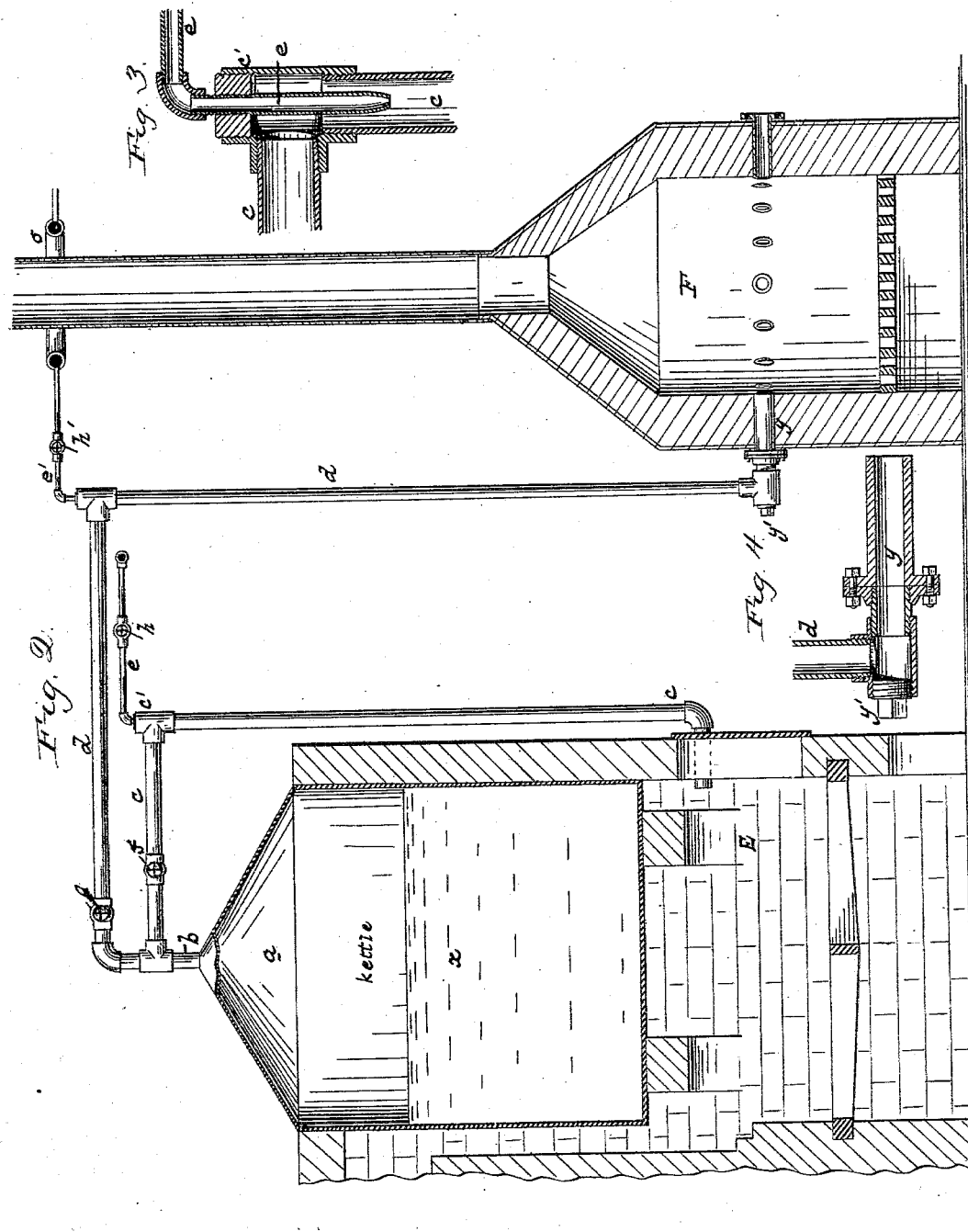

UNITED STATES PATENT OFFICE.

EDWARD J. DE SMEDT, OF WASHINGTON, DISTRICT OF COLUMBIA.

REFINING ASPHALTUM.

SPECIFICATION forming part of Letters Patent No. 286,896, dated October 9, 1883.

Application filed September 11, 1883. (No model.)

*To all whom it may concern:*

Be it known that I, EDWARD J. DE SMEDT, of the city of Washington, in the District of Columbia, have invented a certain new and useful Improvement in Refining Asphaltum for Paving and other Purposes, of which the following is a specification.

Crude asphaltum, in order to be put in condition for use, must first be purified or refined, with a view to eliminate therefrom the water and foreign mineral and vegetable matters. The asphaltum used in this country is mostly Trinidad asphaltum, which in the crude state is composed of asphaltum proper, water, and mineral and vegetable matters, together with small quantities of sulphur and of chloride of sodium. It is ordinarily refined or purified by heating it to a high degree—sometimes even as high as 700° Fahrenheit—in large kettles, each adapted to contain about ten tons of melted asphaltum. When the asphaltum is brought to this high temperature, some of its component hydrocarbons are decomposed and new compounds are formed. The hydrogen of some of the decomposed hydrocarbons combines with the sulphur, thus forming hydrogen sulphuret and creating a very disagreeable smell. Bisulphite of carbon is also one of the new compounds formed. In fact, several gases of very disagreeable odor are thus generated. These gases, which constantly emanate from works where asphaltum is refined, permeate a large extent of territory, and, as is well known, are exceedingly obnoxious to those living in the neighborhood.

The object of my invention is to destroy these gases. The best method of effecting this result is by combustion; but in order to burn them economically, successfully, and in such manner as to suppress at all times obnoxious odors, I have found it necessary to proceed in a special way, which can best be explained and understood by reference to the accompanying drawings, in which—

Figure 1 is a plan view of so much of a plant or apparatus for purifying or refining asphaltum as required for purposes of explanation. Fig. 2 is a section on enlarged scale on line 2 2, Fig. 1. Fig. 3 is an enlarged sectional view of the steam-injector device used by me to facilitate the exhausting of the fumes or gases from the kettles. Fig. 4 is a like view of one of the tuyeres or tubes through which the abducted gases are discharged into the furnace, where they are consumed.

In the plant represented in the drawings, there are four furnaces or sets of furnaces, A B C D, each containing four melting-kettles, as indicated at 1 2 3 4. The kettles are set in brick-work or masonry over the four chambers of the furnaces, as shown in Fig. 2, and each kettle is provided with a cover, $a$. The joint between the kettle and cover is not gas-tight, it being not only difficult to make such a joint, but also dangerous, because of the liability of explosion due to accidental accumulation of gases, and consequent undue increase of pressure in the kettle. From the top of the cover leads a pipe, $b$, which by branch pipe $c\ c$ is in communication with the fire-chamber E of the kettle-heating furnace. Thus the space within the kettle, over the asphaltum $x$, Fig. 2, therein, is in communication with the fire box or chamber of the furnace, and consequently the gases given off by the heated asphaltum can pass from the kettle to the fire-box, where they will be consumed. But it has been found that it is not sufficient merely to provide a conduit of this kind for the gases and furnaces. They gather in kettle faster than they can be carried off through the conduit, and leak, as before, through the joint between the kettle and cover. To remedy this I make use of means for creating artificially a partial vacuum in the kettle and a draft in the abductor-conduit. The most convenient means for the purpose consists of a steam jet or nozzle, $e$, which communicates with some suitable source of steam-supply, and enters the pipe $c$ at elbow $c'$, as indicated more plainly in Fig. 3. The jet of steam under this arrangement acts on the principle of an ejector, exhausting the fumes and vapors from the kettle and forcing them along into the furnace below. Practical use of this apparatus has demonstrated that even with an imperfect and leaky cover there is, under these conditions, no escape of gases or fumes, the tendency being, rather, for outside air to be drawn in than inside gases to be forced out through the imperfections in the cover. In this way I completely suppress all emanation of obnoxious fumes or gases during the melting and refining operation; and, moreover, by producing a partial vacuum in the kettle, I am enabled to do the same work with less heat, inasmuch as the reduction of pressure which is effected permits the requisite evaporating action to take place at a proportionally lower temperature.

The apparatus thus far described is effective so long as the melting and refining operation continues. It becomes necessary, however, as soon as the operation is carried far enough, to let the contents of the kettle cool. This of course necessitates decrease of entire drawing of the furnace-fire. Consequently the obnoxious gases from the asphaltum can no longer be burned therein; but as these gases still continue to be evolved until the asphaltum has cooled down very considerably, some provision must be made for disposing of them after they can no longer be burned in the furnace which heats the melting-kettle. To this end I construct a special furnace, F, separate from the kettle-heating furnaces, and I lead from the abductor-pipe $b$ of each kettle a pipe, $d$, (separate and distinct from pipe $c$,) which enters the fire-box or chamber G of the special furnace. Each of these pipes $d$ is provided with an ejector, $e'$, (similar to $e$,) or other suitable means for exhausting the gases from the kettle and carrying them into the special furnace. Pipes $d$ $c$ are provided each with cock or valve for opening and closing them, as indicated at $f$ $g$, and the steam jets or ejectors $e$ $e'$ are also provided with valves $h$ $h'$ for their regulation. So long as melting heat in the kettle-furnace is required, valve $f$ is open, valve $g$ is closed, ejector $e$ is in action, ejector $e'$ is out of action, and the gases are taken from the kettle and carried into the kettle-furnace through pipe $c$. As soon, however, as the fire there is no longer required, and the now sufficiently-heated asphaltum is to cool down, the pipe $c$ is closed, pipe $d$ is opened, its ejector is put in action, and the fumes from the cooling asphaltum are carried off and discharged into the special furnaces F, where they are consumed or transformed into unobjectionable gases, which can be discharged from a lofty chimney into the upper atmosphere.

Fig. 4 shows in detail the tuyere or tube $y$, through which I discharge the gases in the furnace. I provide it at its outer end with a removable plug, $y'$, so that access can be had to its interior for cleaning purposes whenever desired.

I have described particularly but one kettle and its connections. Inasmuch as all the kettles are arranged in the same way and have the same connections with their several furnaces, and also with the central special furnace, which, as seen in Fig. 1, is common to all the kettles, a description of one will answer for all.

Any convenient arrangement for supplying $e$ and $e'$ can be used. In Fig. 1, $m$ is the pipe leading from source of steam-supply to an annular pipe, $o$, surrounding the stack of the central furnace, F, and from annular pipe $o$ radiate the pipes from which the several ejectors $e$ $e'$ are supplied with steam. As shown also in Fig. 1, the exhaust-pipes $d$ of all the kettles converge toward and enter the central furnace, F.

What I claim as new and of my invention is—

1. As an improvement in the art of refining asphaltum, the process hereinbefore described of removing and destroying the gases and fumes evolved from the heated asphaltum, consisting in exhausting the same from the covered kettle containing the heated asphaltum, through a close conduit, into a furnace, where they are consumed, substantially in the manner and for the purposes hereinbefore set forth.

2. The combination of the covered melting-kettle, the conduit leading from the space therein above the asphaltum to the furnace, and the ejector acting both to maintain a partial vacuum in the kettle above the asphaltum therein and to force the abducted gases and fumes from the kettle into the furnace, substantially as and for the purposes hereinbefore set forth.

3. The combination of the covered melting-kettle, the conduit leading from the upper part of the same both to the furnace for heating said kettle and to another separate and special furnace, exhausting devices for abducting the fumes and gases from the kettle and forcing the same through the conduit, and means whereby the abducted gases are directed into either furnace at will, substantially as and for the purposes hereinbefore set forth.

4. The combination, with a number of covered melting-kettles and furnaces for heating the same, of a separate special furnace, conduits leading from each kettle both to the kettle-heating furnace and to the special furnace, exhaust devices for abducting the gases and fumes from the several kettles and forcing the same through their appropriate conduits, and means whereby the abducted gases from the several kettles are directed at will into the kettle-heating furnaces or into the separate special furnace, substantially as and for the purposes hereinbefore set forth.

In testimony whereof I have hereunto set my hand this 3d day of September, 1883.

EDWARD J. DE SMEDT.

Witnesses:
EWELL A. DICK,
J. WALTER BLANDFORD.